US012599841B2

(12) United States Patent (10) Patent No.: US 12,599,841 B2
Chen et al. (45) Date of Patent: Apr. 14, 2026

(54) CHAT-BASED USER-GENERATED CONTENT ASSISTANCE

(71) Applicant: SONY INTERACTIVE ENTERTAINMENT LLC, San Mateo, CA (US)

(72) Inventors: Yuanhan Chen, San Mateo, CA (US); Azita Refah, San Mateo, CA (US); Brittni Snoke, San Mateo, CA (US); Steven Osman, San Mateo, CA (US); Jessica Chiang, San Mateo, CA (US)

(73) Assignee: SONY INTERACTIVE ENTERTAINMENT LLC

( * ) Notice: Subject to any disclaimer, the term of this patent is extended or adjusted under 35 U.S.C. 154(b) by 168 days.

(21) Appl. No.: 18/231,080

(22) Filed: Aug. 7, 2023

(65) Prior Publication Data

US 2025/0050221 A1 Feb. 13, 2025

(51) Int. Cl.
| | |
|---|---|
| *A63F 13/63* | (2014.01) |
| *A63F 13/533* | (2014.01) |
| *A63F 13/58* | (2014.01) |
| *A63F 13/67* | (2014.01) |
| *G06F 40/35* | (2020.01) |

(52) U.S. Cl.
CPC ............ *A63F 13/63* (2014.09); *A63F 13/533* (2014.09); *A63F 13/58* (2014.09); *A63F 13/67* (2014.09); *G06F 40/35* (2020.01); *A63F 2300/5553* (2013.01); *A63F 2300/65* (2013.01)

(58) Field of Classification Search
CPC ........ A63F 13/63; A63F 13/533; A63F 13/58; A63F 13/67; A63F 2300/5553; A63F 2300/65; A63F 13/35; A63F 13/69; A63F 13/825; A63F 13/87; G04F 40/35; G06F 40/35
See application file for complete search history.

(56) References Cited

U.S. PATENT DOCUMENTS

| | | |
|---|---|---|
| 2015/0310758 A1 | 10/2015 | Daddona et al. |
| 2015/0321097 A1 | 11/2015 | Wilkiewicz et al. |
| 2018/0367484 A1* | 12/2018 | Rodriguez .............. H04L 67/75 |

(Continued)

OTHER PUBLICATIONS

PCT Application No. PCT/US2024/025012, International Search Report and Written Opinion dated Jul. 8, 2024.
(Continued)

*Primary Examiner* — Thomas H Henry
(74) *Attorney, Agent, or Firm* — Kilpatrick Townsend & Stockton LLP

(57) ABSTRACT
Systems and methods for generating chat-based user-generated content. The system may receive a chat-based communication over a communication network from a user device of a user and interpret the chat-based communication using a machine learning model. This may include identifying a meaning of content within the chat-based communication and predicting that the content within the chat-based communication indicates one or more virtual characteristics. A custom character for use within a virtual environment may be generated based on the identified meaning and the predicted virtual characteristics. The custom character may include the predicted virtual characteristics. The system may present the custom character to the user via a user interface of the user device.

19 Claims, 7 Drawing Sheets

CUSTOMIZATION INTERFACE 310

CUSTOM CHARACTER 312

Can you make my character look like me?

Yes, User. How is this?

Can you give him cool shoes?

And a cape?

Yes! Do you like this cape?

CHAT INTERFACE 314

(56)     References Cited

U.S. PATENT DOCUMENTS

| | | |
|---|---|---|
| 2019/0250773 A1 | 8/2019 | Miyaki |
| 2020/0206631 A1 | 7/2020 | Sumant et al. |

OTHER PUBLICATIONS

PCT Application No. PCT/US2024/025418, International Search Report and Written Opinion dated Aug. 7, 2024.
U.S. Appl. No. 18/230,031, Lachmin, Modifying Gameplay Experiences, filed Aug. 3, 2023.
PCT/US2024/025012, Lachmin Singh, Modifying Gameplay Experiences, Apr. 17, 2024
PCT/US2024/025418, Yuanhan Chen, Chat-Based User-Generated Content Assistance, Apr. 19, 2024.

\* cited by examiner

Figure 3A:
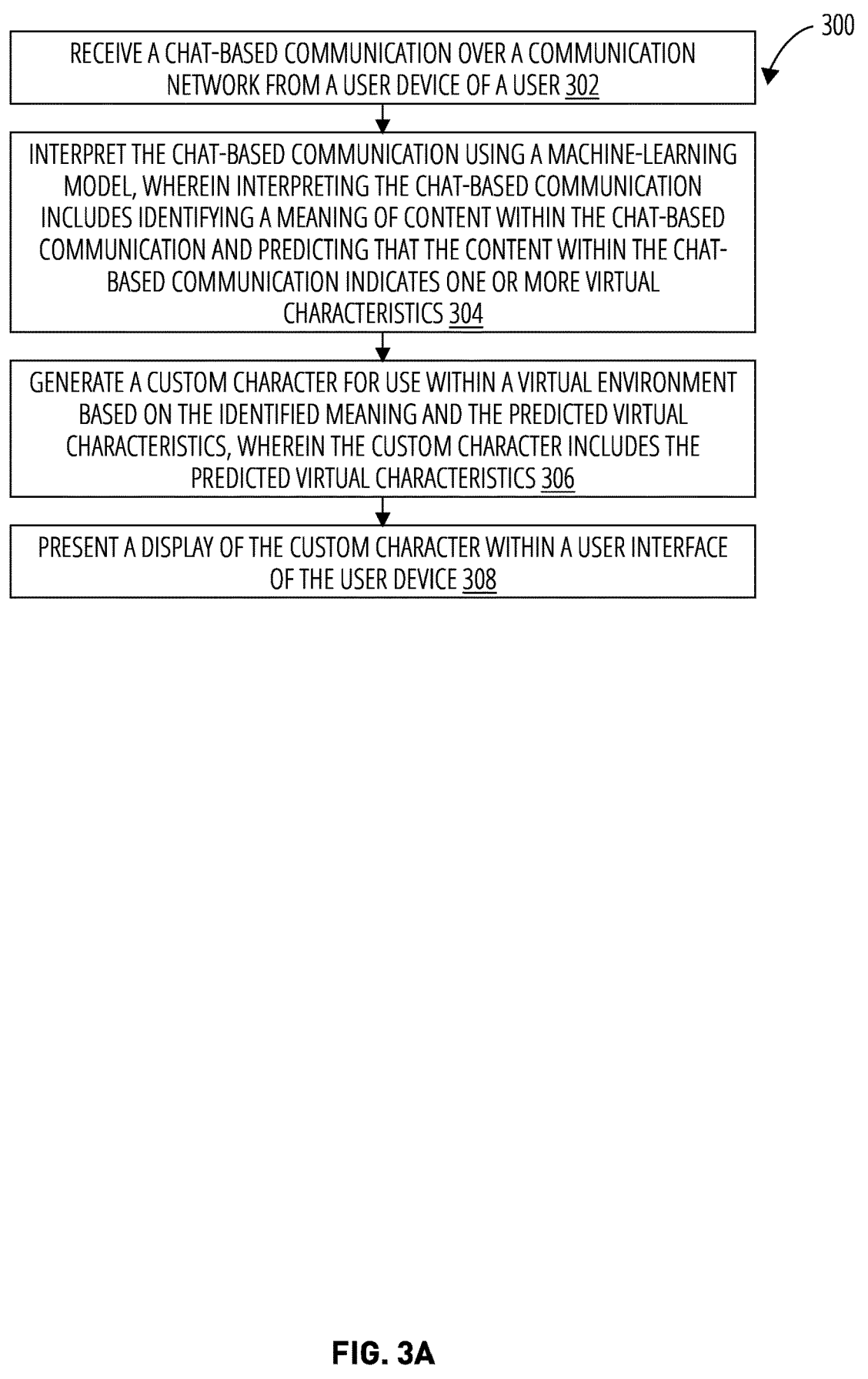

300

RECEIVE A CHAT-BASED COMMUNICATION OVER A COMMUNICATION NETWORK FROM A USER DEVICE OF A USER 302

INTERPRET THE CHAT-BASED COMMUNICATION USING A MACHINE-LEARNING MODEL, WHEREIN INTERPRETING THE CHAT-BASED COMMUNICATION INCLUDES IDENTIFYING A MEANING OF CONTENT WITHIN THE CHAT-BASED COMMUNICATION AND PREDICTING THAT THE CONTENT WITHIN THE CHAT-BASED COMMUNICATION INDICATES ONE OR MORE VIRTUAL CHARACTERISTICS 304

GENERATE A CUSTOM CHARACTER FOR USE WITHIN A VIRTUAL ENVIRONMENT BASED ON THE IDENTIFIED MEANING AND THE PREDICTED VIRTUAL CHARACTERISTICS, WHEREIN THE CUSTOM CHARACTER INCLUDES THE PREDICTED VIRTUAL CHARACTERISTICS 306

PRESENT A DISPLAY OF THE CUSTOM CHARACTER WITHIN A USER INTERFACE OF THE USER DEVICE 308

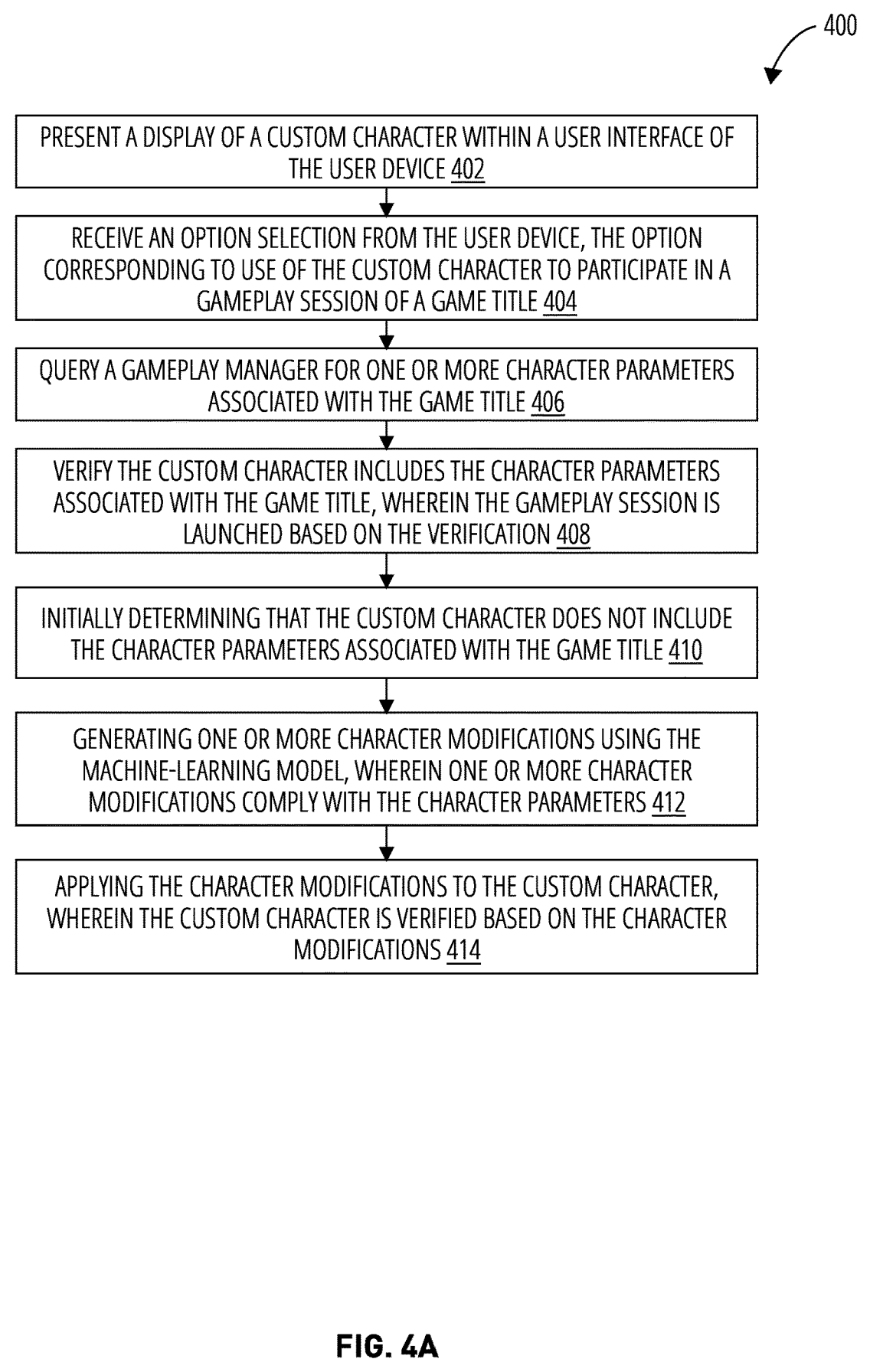

PRESENT A DISPLAY OF A CUSTOM CHARACTER WITHIN A USER INTERFACE OF THE USER DEVICE 402

↓

RECEIVE AN OPTION SELECTION FROM THE USER DEVICE, THE OPTION CORRESPONDING TO USE OF THE CUSTOM CHARACTER TO PARTICIPATE IN A GAMEPLAY SESSION OF A GAME TITLE 404

↓

QUERY A GAMEPLAY MANAGER FOR ONE OR MORE CHARACTER PARAMETERS ASSOCIATED WITH THE GAME TITLE 406

↓

VERIFY THE CUSTOM CHARACTER INCLUDES THE CHARACTER PARAMETERS ASSOCIATED WITH THE GAME TITLE, WHEREIN THE GAMEPLAY SESSION IS LAUNCHED BASED ON THE VERIFICATION 408

↓

INITIALLY DETERMINING THAT THE CUSTOM CHARACTER DOES NOT INCLUDE THE CHARACTER PARAMETERS ASSOCIATED WITH THE GAME TITLE 410

↓

GENERATING ONE OR MORE CHARACTER MODIFICATIONS USING THE MACHINE-LEARNING MODEL, WHEREIN ONE OR MORE CHARACTER MODIFICATIONS COMPLY WITH THE CHARACTER PARAMETERS 412

↓

APPLYING THE CHARACTER MODIFICATIONS TO THE CUSTOM CHARACTER, WHEREIN THE CUSTOM CHARACTER IS VERIFIED BASED ON THE CHARACTER MODIFICATIONS 414

FIG. 4A

CHAT-BASED USER-GENERATED CONTENT ASSISTANCE

BACKGROUND OF THE INVENTION

1. Field of the Disclosure

The present invention generally relates to user-generated content. More specifically, the present invention relates to user-generated content assistance using chat-based communications.

2. Description of the Related Art

Presently available game titles and other interactive titles may allow a user to customize objects or characters for use during gameplay sessions and other interactive virtual sessions. Customization allows, for example, objects or characters to match or otherwise reflect a particular user's personality, likes/dislikes, preferences, mannerisms, looks, etc. Such customization is generally performed based on manual input selecting desired characteristics from among a limited set of available characteristics or other customization factors. For example, various menus and sub-menus (and sub-sub menus, etc.) may be provided for user selection. Where numerous customization options are available, however, the user may be overwhelmed or otherwise have difficulty navigating the customization process in order to find, select, and incorporate a desired customization into digital content. As a result, customization may require the user to devote a substantial amount of time, thought, and iterations in order to customize a character to all of their particular needs or wants. Some users (e.g., children) may be unable to manually input desired characteristics and/or may not possess the ability to effectively communicate how they wish to customize a character and/or object.

While some platforms may have accessibility features and/or content targeted to and appropriate for users of a particular age, such features do not resolve the underlying problem of how to streamline the oftentimes complex and time-consuming customization process for virtual content (e.g., characters, objects, environments) for a particular user. Moreover, the difficulty of customizing content may result in unsatisfactory or poor user experiences within the virtual environment and lead to disengagement from the content title. There is, therefore, a need in the art for an improved systems and methods of chat-based user-generated content assistance.

SUMMARY OF THE CLAIMED INVENTION

Embodiments of the present invention include systems and methods for generating chat-based user-generated content. The system may receive a chat-based communication over a communication network from a user device of a user and interpret the chat-based communication using a machine learning model. This may include identifying a meaning of content within the chat-based communication and predicting that the content within the chat-based communication indicates one or more virtual characteristics. A custom character for use within a virtual environment may be generated based on the identified meaning and the predicted virtual characteristics. The custom character may include the predicted virtual characteristics. The system may present the custom character to the user via a user interface of the user device.

BRIEF DESCRIPTION OF THE DRAWINGS

FIG. 3A is a flowchart illustrating an exemplary method for chat-based user-generated content assistance in accordance with one embodiment.

FIG. 4A is a flowchart illustrating an exemplary method for adapting custom user-generated content for gameplay in accordance with one embodiment.

DETAILED DESCRIPTION

Embodiments of the present invention include systems and methods for generating chat-based user-generated content. The system may receive a chat-based communication over a communication network from a user device of a user and interpret the chat-based communication using a machine learning model. This may include identifying a meaning of content within the chat-based communication and predicting that the content within the chat-based communication indicates one or more virtual characteristics. A custom character for use within a virtual environment may be generated based on the identified meaning and the predicted virtual characteristics. The custom character may include the predicted virtual characteristics. The system may present the custom character to the user via a user interface of the user device.

Figure 1:
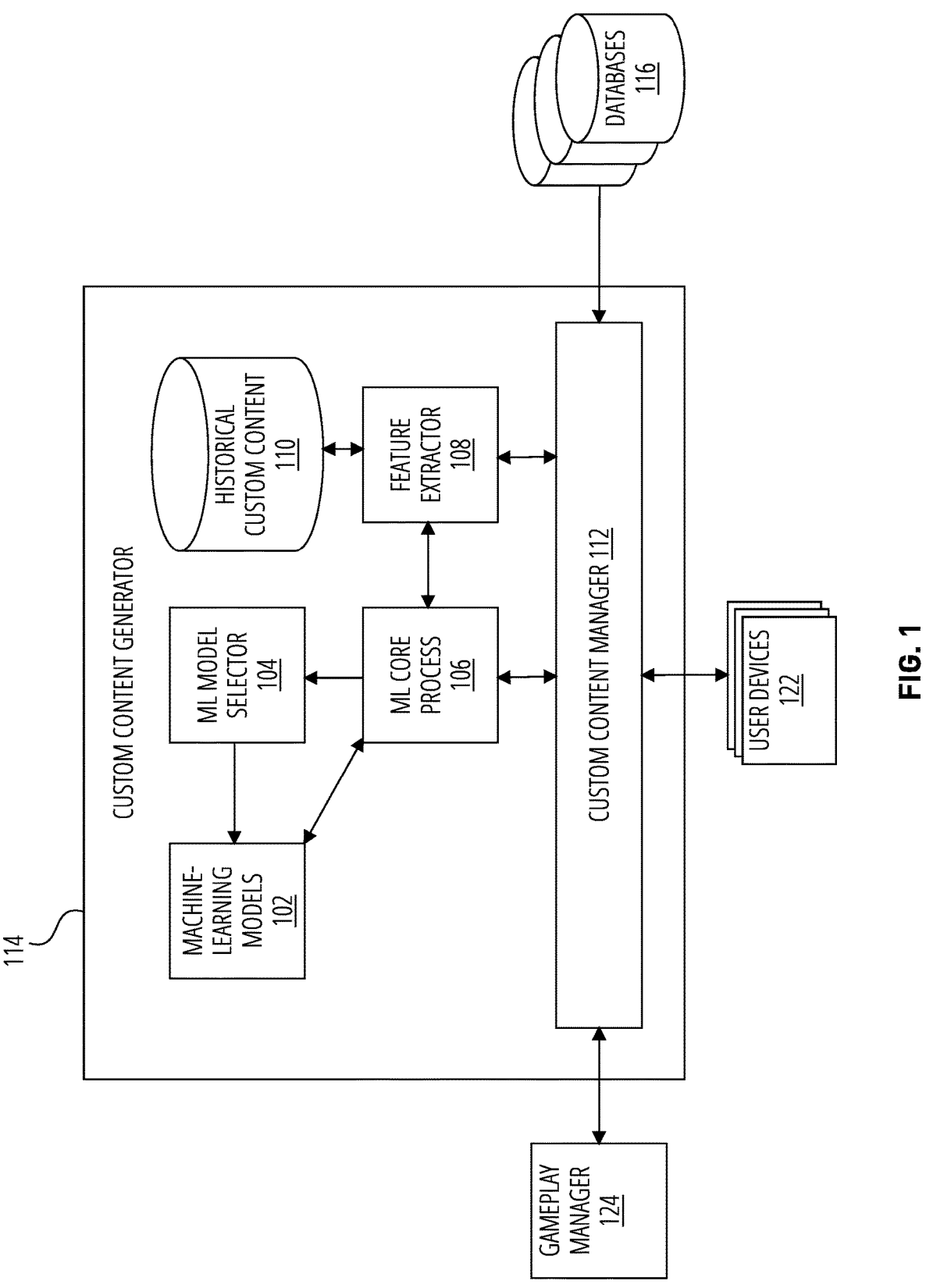
FIG. 1 illustrates an exemplary network environment in which a system for custom content generation trained in accordance with machine learning may be implemented.

FIG. 1 illustrates an exemplary network environment in which a system for custom content generation trained in accordance with machine learning may be implemented. Such a network environment may include a variety of different networked systems and system devices, including custom content generator 114, databases 116, user devices 122, and gameplay manager 124. The devices may communicate with each other directly or through one or more intermediary networks (e.g., local area network, wide area network, Internet, virtual private networks, etc.).

Custom content generator 114 may facilitate the generation of custom user-generated content (e.g., characters, weapons, objects, etc.) by a user associated with a user device 122 (e.g., a gaming system, laptop, desktop, smartphone, etc.). As illustrated, custom content generator 114 may include machine learning models 102, ML model selector 104, ML core process 106, feature extractor 108, historical custom content 110, and custom content manager 112. Such components of custom content generator 114 may be executable by one or more processing devices (e.g., computing devices, mobile devices, servers, databases, etc.) configured to operated together to provide the services of custom content generator 114. The components 102-112 and processing devices may operate within a same local network (e.g., such as a local area network, wide area network, mesh network, etc.) or may be distributed processing devices (e.g., such as a cloud network, distributed processing network, or the like).

User devices 122 may connect to and communicate with custom content generator 114 to trigger a request for a new custom generation session using custom content generator 114. The request may include or otherwise indicate one or more parameters, such as type of content (e.g., character, object, etc.), a desired game title, and one or more chat-based communications from user devices 122. Chat-based communications that may be the basis for triggering the custom generation session and as a source of customization parameters may include audio segments received via a microphone of user devices 122, written communications input to user devices 122, any combination thereof, or the like. The request may also include other parameters such as user profile data (associated with user devices 122, such as, but not limited to, user characteristics, user demographics, user gameplay history, user preferences, social contact, etc.), prior custom characters and/or content associated with the user, combinations thereof, or the like.

Custom content manager 112 may then instantiate a new customization session for the user device 122. The new customization session may include a specific environment hosted by custom content manager 112 and presented to user devices 122 via a graphical user interface. The custom content manager 112 using ML core process 106 may provision one or more machine learning models 102 to enable any of the extended functionalities. The machine learning models 102 may be configured to provide natural language processing (e.g., such as a large language model, bi-directional transformers, zero/few shot learners, deep neural networks, etc.), content generation (e.g., using techniques of large language models, deep neural networks, generative adversarial networks, etc.), single variate or multivariate classifiers (e.g., k-nearest neighbors, random forest, logarithmic regression, decision trees, support vector machines, gradient decent, etc.), image processing (e.g., using deep neural networks, convolutional neural networks, etc.), sequenced data processors (e.g., such as recurrent neural networks, etc. capable of processing datasets organized according to a taxonomic sequence), and/or the like.

Such machine learning techniques may further be applied to game data and associated user-generated content, which may be captured during gameplay sessions of different users and user devices 122. Such game data may include not only information regarding the game titles being played, but also user profiles, selections, behaviors, etc., associated with the gameplay session. Such game data may be monitored and stored in memory as object or activity files, which may be used for supervised and unsupervised learning whereby a model may be trained to recognize patterns between certain game/user data and associated user-generated content characteristics. In some implementations, sets of the object files or activity files may be labeled in accordance with any combination of game metadata and user feedback, including user feedback during content customization sessions.

The machine learning models 102 may be trained to process natural language communications (e.g., such as verbal, textual, etc.) in conjunction with available user data to generate custom user-generated content according to one or more determined virtual characteristics (e.g., utilizing input from the user, user characteristics, prior custom characters, one or more character parameters for a game title, data pertaining to one or more additional users, gameplay manager 124, third-party databases 116, etc.), generate one or more prompts for the user (e.g., suggest additional virtual characteristics for the custom character and/or object, ask follow-up questions after receiving user feedback, etc.), generate the custom content (e.g., present the custom character, present optional characteristics for the custom character, present an interface to the user, etc.), and/or the like. Different machine learning models 102 may be trained using different types of data input, which may be specific to the user, the user demographic, associated game or other interactive content title(s) and genres thereof, social contacts, etc. Using the selected data inputs, therefore, the machine learning models 102 may be trained to identify information regarding the requesting user and identify content customization parameters that may be specifically relevant to the requesting user (e.g., female 10-year old child that plays dancing games, male 7-year old child that plays racing games, male 31-year old adult that plays horror-based games).

ML model selector 104 may be executable to select one or more machine learning models 102 to apply to a received request or query from user device 122. Such selection by ML model selector 104 may include selection of one or more machine learning models 102, generating one or more new machine learning models, or training one or more machine learning model 102 based on user data or associated game data to apply to the request from the user device 122.

Custom content manager 112 may pass chat-based communications (e.g., text and/or audio) extracted over the customization session, along with any user data retrieved from database 116 or extrapolated therefrom, to ML core process 106 to process the communications using the one or more machine learning models selected by ML model selector 104. ML core process 106 may monitor one or more machine learning models 102 configured to provide the services of the communication network. ML core process 106 may train new machine learning models 102, retrain (or reinforce) existing machine learning models 102, delete machine learning models 102, and/or the like. Since ML core process 106 manages the operations of a variety of machine learning models 102, each request to ML core process 106 may include an identification of a particular machine learning model 102, a requested output, or the like to enable ML core process 106 to route the request to an appropriate machine learning model 102 or instantiate and train a new machine learning model 102. Alternatively, ML core process 106 may analyze data to be processed that is included in the request to select an appropriate machine learning model 102 configured to process data of that type.

If ML core process 106 cannot identify a trained machine learning model 102 configured to process the request, then ML core process 106 may instantiate and train one or more machine learning models 102 to process the request. Machine learning models 102 may be trained to process a particular input and/or generate a particular output. ML core process 106 may instantiate and train machine learning models 102 based on the particular data to be processed and/or the particular output requested. For example, user sentiment analysis (e.g., user intent, etc.) may be determined a natural language processor and/or a classifier while image processing may be performed using a convolutional neural network.

ML core process 106 may select one or more machine learning models 102 based on characteristics of the data to be processed and/or the output expected. ML core process 106 may then use feature extractor 108 to generate training datasets for the new machine learning models 102 (e.g., other than those models configured to perform features extraction such as some deep learning networks, etc.).

Feature extractor 108 may define training dataset using historical content 110. Historical custom content 110 may store information regarding features associated with different game options, as well as features associated with previous customization sessions, different combinations thereof, and/or one or more custom characters generated from previous customization sessions. In some instances, the previous customization sessions may not involve the user of user devices 122. Previous customization sessions may include manually and/or procedurally generated data generated for use in training machine learning models 102. Historical custom content 110 may not store any information associated with particular users. Alternatively, historical custom content 110 may store features extracted from customization sessions involving the user of user devices 122 and/or other users.

Feature extractor 108 may extract features based on the type of model to be trained and the type of training to be performed (e.g., supervised, unsupervised, etc.) from historical custom content 110. Feature extractor 108 may include a search function (e.g., such as procedural search, Boolean search, natural language search, large language model assisted search, or the like) to enable ML core process 106, an administrator, or the like to search for particular datasets within historical custom content 110 to improve the data selection for the training datasets. Feature extractor 108 may aggregate the extracted features into one or more training datasets usable to train a respective machine learning model 102 of the one or more machine learning models 102. The training datasets may include training datasets for training the machine learning model 102, training datasets to test a trained machine learning model, and/or the like. The one or more training datasets may be passed to ML core process 106, which may manage the training process.

Feature extractor 108 may pass the one or more training datasets to ML core process 106, and ML core process 106 may initiate a training phase for the one or more machine learning models 102. The one or more machine learning models 102 may be trained using supervised learning, unsupervised learning, self-supervised learning, or the like. The one or more machine learning models 102 may be trained for a predetermined time interval, a predetermined quantity of iterations, until one or more target accuracy metrics have exceeded a corresponding threshold (e.g., accuracy, precision, area under the curve, logarithmic loss, F1 score, weighted human disagreement rate, cross entropy, mean absolute error, mean square error, etc.), user input, combinations thereof, or the like. Once trained, ML core process 106 may validate and/or test the trained machine learning models 102 using additional training datasets. The machine learning models 102 may also be trained at runtime using reinforcement learning.

Once the machine learning models 102 are trained, ML core process 106 may manage the operation of the one or more machine learning models 102 (stored with other machine learning models 102) during runtime. ML core process 106 may direct feature extractor 108 to define feature vectors from received data (e.g., such as audio segments from user devices 122, chat-based communications from user devices 122, responses of user devices 122 to prompts presented by custom content generator 114, etc.). In some instances, ML core process 106 may facilitate generation of a feature vector each time there is a change in a communication channel (e.g., an audio segment is transmitted over the communication channel from user devices 122, a new chat-based communication is received, a response to a prompt is received from user devices 122, data is received from gameplay manager 124 pertaining to a specific game title, and/or the like). ML core process 106 may continually execute the one or more machine learning models 102 to generate corresponding output. ML core process 106 may evaluate the outputs to determine whether to manipulate a user interface (e.g., and/or a virtual reality interface) of the customization session based on the output (e.g., post generated custom characters and/or objects, present generated prompts to the user for feedback, modify custom characters and/or objects according to a specified game title, present additional custom character and/or object characteristics to the user, etc.).

For example, ML core process 106 may detect a new audio segment chat-based communication over the customization session. ML core process 106 may execute a machine learning model 102 (e.g., such as a recurrent neural network) to process the audio segment to determine the words with the audio segment (if any) and a sentiment (e.g., a predicted meaning of the individual words or the words as a whole). ML core process 106 may execute another machine learning model 102 (e.g., such as a classifier, a large language model and/or transformer, a generative adversarial network, etc.), to generate content corresponding to the words and/or sentiment that can be provided to a user device 122. For instance, the words may include "make me an orange monster" with a sentiment of "characteristics of a custom character." ML core process 106 may yet execute another machine learning model 102 to identify characteristics of the user (e.g., child versus adult) based on voice analysis, image analysis (e.g., of user images captured by camera of user device 122), user profile data, etc., so as to determine whether the "orange monster" should be generated as having child-like (versus horror-based) appearance, voice, abilities, in-game actions, etc. The other machine learning model 102 may process the words and sentiment to generate content for a user interface (e.g., user interface 518 and/or virtual reality interface 538 of FIG. 5) such as one or more custom characters that are considered "orange monsters," one or more suggestions for additional characteristics for the custom characters (e.g., weapons, accessories, wings, color attributes, body attributes, etc.), one or more prompts for additional characteristics intended to illicit user feedback (e.g., "Your orange monster can't walk, what would help him walk?"), etc.

ML core process 106 may direct feature extractor 108 to define other feature vectors to process other data using machine learning models 102 in parallel with the others of the aforementioned machine learning models 102 to provide other resources of custom content generator 114. ML core process 106 may execute any number of machine learning models in parallel to provide the functionality of a customization session.

Figure 2:
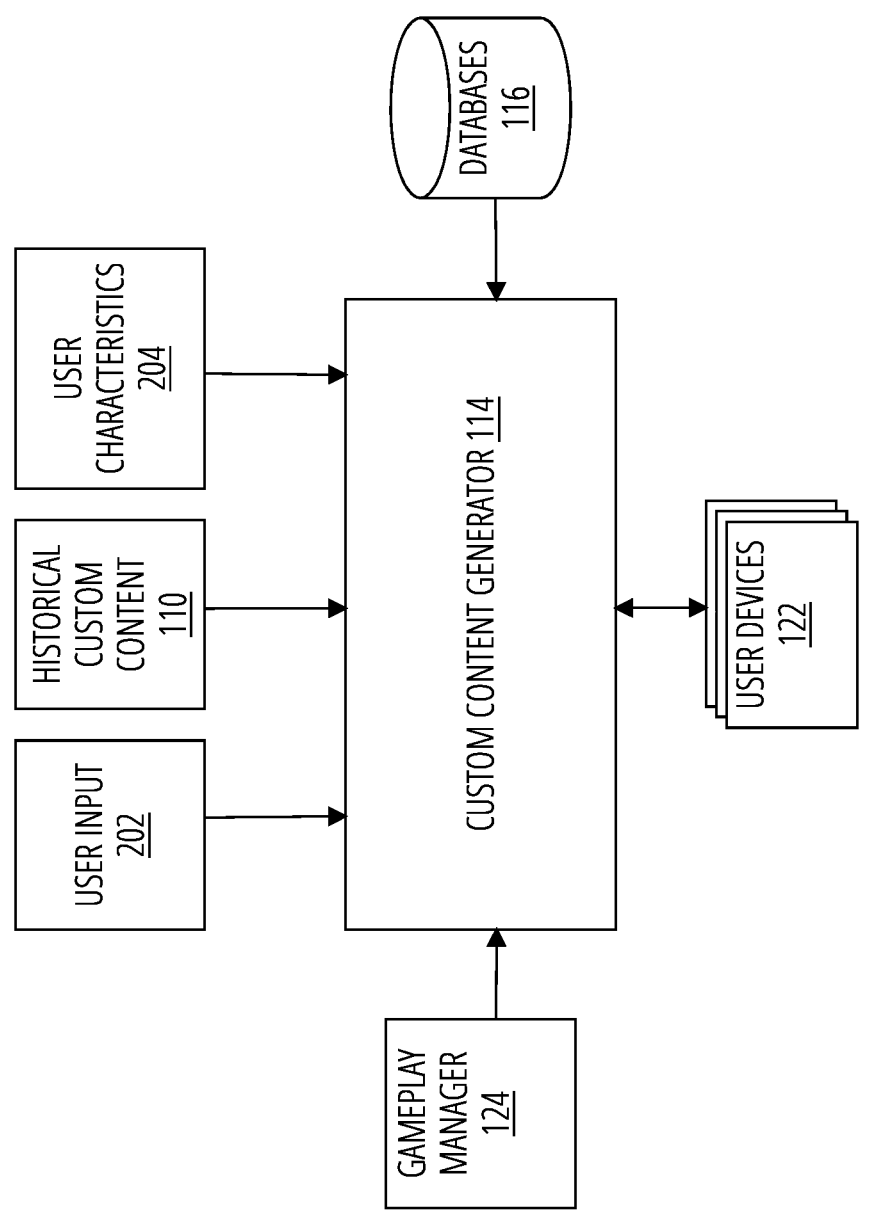
FIG. 2 illustrates the trained custom content generator generating custom user-generated content in accordance with one embodiment.

FIG. 2 illustrates the trained custom content generator 114 generating custom user-generated content in accordance with one embodiment. Custom content generator 114 may receive input from gameplay manager 124, user input 202, historical custom content 110, user characteristics 204, third-party databases 116, any combination thereof, or the like, to generate custom content to present to user devices 122.

Custom content generator 114 may utilize one or more different sources of data for purposes of training, generating, initializing, instantiating, and/or utilizing one or more machine learning models trained to generate custom user-generated content for use in one or more gameplay sessions associated with one or more game titles. In some instances, custom content generator 114 may receive input from gameplay manager 124. For example, custom content generator 114 may receive a game title from user devices 122. Custom content generator 114 may query gameplay manager 124 for one or more character parameters required for the particular game title. The character parameters may be custom character characteristics required for effective gameplay of a particular game title. For example, the game title may require flying by the characters, therefore the character parameters may indicate that a custom character requires wings, a jetpack, magic capabilities, a hoverboard, or the like. Custom content generator 114 may generate the custom content according to the character parameters associated with the game title.

In some examples, the character parameters may be incompatible with other characteristics of the custom content (e.g., the game may require legs, but a custom character may be a snake). Custom content generator 114 may generate one or more notifications and/or prompts directed to the user to notify the user that the custom content is incompatible with the particular game title. The notifications and/or prompts may be a warning message (e.g., "your custom character is unable to play GAME TITLE"), a prompt to add/remove features (e.g., "GAME TITLE requires lots of running, would you like to add legs to your custom character?"), a probative question intended to educate the user (e.g., "It looks like GAME TITLE needs your character to fly. What would help your character fly?"), notifying the user that characteristics were added (e.g., "Eyes were added to your character in order to play GAME TITLE."), any combination thereof, or the like. After receiving the notifications and/or prompts, user devices 122 may output one or more messages to custom content generator 114 indicating approval or disapproval, if necessary, of the adjustments made to the custom character. Custom content generator 114 may also adapt a custom character in different ways for different game titles, including changing color palettes, animation or graphic art style, clothing or accessories, equipment or weapons, etc., so as to coordinate with the art or design elements within a specific interactive content title.

Custom content generator 114 may receive input from user input 202. User input 202 may include chat-based communications from the user. The chat-based communications may include audio segments (e.g., commands received via a microphone associated with user devices 122, etc.), text communications (e.g., messages sent to custom content generator 114 via user devices 122, etc.), gestures (e.g., bodily movements or gestures received via a visual input, like a camera or webcam, associated with user devices 122), any combination thereof, or the like. Custom content generator 114 may employ one or more machine learning models (e.g., the machine learning models discussed in FIG. 1) to determine the meaning of the chat-based communication and/or predict one or more virtual characteristics of the custom object. For example, the user may input a chat-based communication that states "I want a pink dragon," and a first machine learning model may interpret the meaning of the chat-based communication and one or more predicted virtual characteristics. The meaning, in this example, may be "desired characteristics of a custom character" and some predicted virtual characteristics may be "pink" and "dragon."

Custom content generator 114 may receive input from historical custom content 110. Historical custom content 110 may include prior-generated custom content associated with the user and/or other users. For example, if the user has shown prior tendencies to request a particular virtual characteristic, custom content generator 114 may automatically add the particular virtual characteristic to the custom object. In some examples, a particular virtual characteristic may be popular among users of the same demographic as the user, custom content generator 114 may automatically add the particular virtual characteristic to the custom object. Other data from historical custom content 110 utilized by custom content generator 114 may include certain combinations of virtual characteristics, colors, design style of the custom content (e.g., cartoon, life-like, etc.), clothing/accessories/hair style of the custom content, two-dimensional or three-dimensional, or any combination thereof. In some examples, the user may indicate edits to a prior-generated custom character and/or content. Custom content generator 114 may, according to input from the user, query historical custom content 110 for the prior-generated custom character and/or content and perform adjustments according to communications from the user.

Custom content generator 114 may also receive input from user characteristics 204. User characteristics 204 may include one or more user characteristics associated with the user, such as age, demographic, appearance, preferences, language, geographic region, any combination thereof, or the like. Custom content generator 114 may generate one or more virtual characteristics based on one or more user characteristics received from user characteristics 204. For example, if the user has blonde hair, custom content generator 114 may generate a custom character with blonde hair. In another example, if the user is from a particular geographic region, custom content generator 114 may generate a custom character with similar speech, dialect, and/or language. User characteristics 204 may query for one or more user characteristics from a user profile associated with the user and/or user devices 122. The user profile may be stored on user devices 122 and may contain data input by the user, metadata generated pertaining to the user, and/or predictions about the user. The user profile may also comprise data gathered over one or more gameplay sessions associated with user devices 122 and the user (e.g., while the user is playing a particular game title, during a customization session, while the user is participating in a chatroom hosted by a central server accessible by user devices 122, etc.). User characteristics may also include direct social circle (e.g., online friends, teammates), as well as any other player or content that the user may follow or have subscribed to follow as indicated by user activity data. As such, a user may also express their query in relation to a favorite player or character (e.g., "I want a character just like BigNameStreamer27's in Game Title 6, but with blue hair instead of green").

Custom content generator 114 may receive input from one or more third-party databases 116. The third-party databases 116 may include data provided by one or more sponsors, from the central server, from one or more programs running concurrently on user devices 122 (e.g., a parental control), from additional sources of demographic data (e.g., social media, etc.), any combination thereof, or the like. The data provided may include moderation parameters determined by parental controls, administrative controls, settings associated with user devices 122, game titles, any combination thereof, or the like.

Custom content generator 114 may receive data from databases 116 and generate one or more virtual characteristics according to the received data. For example, if a third-party is a sponsor of a game title and/or the customization process facilitated by custom content generator 114, then custom content generator 114 may put a logo on the custom content (e.g., a logo on a t-shirt, hat, or bag of a custom character). As another example, parental controls may restrict the user devices 122 from making adjustments to a custom character that may be perceived as obscene.

In some examples, custom content generator 114 may be connected to one or more social media sites associated with the user. Custom content generator 114 may generate one or more virtual characteristics according to content posted on a social media site associated with a user. For example, if the user recently posted pictures from a rock concert, custom content generator 114 may generate one or more virtual characteristics that emulate a rock star (e.g., spiky hair, guitar, tattoos, etc.).

In some implementations, custom content generator 114 may generate a unique game title and/or unique gameplay session customized to the user and/or the custom content generated by the user. Custom content generator 114 may receive input from gameplay manager 124 and/or user devices 122 that may include the game titles most often played by the user, likes/dislikes/preferences of the user, age range of the user, skill of the user, etc. Custom content generator 114 may employ one or more machine learning models trained to generate custom content (e.g., using large language models, deep neural networks, generative adversarial networks, etc.). For example, the custom content generator 114 may employ a second machine learning model to generate one or more custom interactive storylines that include the custom character. The custom interactive storylines may be compatible with one or more game titles, or may be a unique game title accessible to user devices 122.

Custom content generator 114 may output the custom content over the duration and/or the conclusion of a customization session conducted with the user. The custom content may include one or more virtual characteristics generated from one or more of the sources described herein (e.g., gameplay manager 124, user input 202, historical custom content 110, user characteristics 204, databases 116, any combination thereof, or the like). The custom content may also include the unique gameplay session, unique game title, and/or custom interactive storyline generated by custom content generator 114. The custom content may be output to a communication interface (e.g., user interface 518 and/or virtual reality interface 538 of FIG. 5) of user devices 122.

FIG. 3A is a flowchart illustrating an exemplary method 300 for chat-based user-generated content assistance in accordance with one embodiment. Although the example flowchart depicts a particular sequence of operations, the sequence may be altered without departing from the scope of the present disclosure. For example, some of the operations depicted may be performed in parallel or in a different sequence that does not materially affect the function of the flowchart. In other examples, different components of an example device or system that implements the flowchart may perform functions at substantially the same time or in a specific sequence.

Method 300 may include receiving a chat-based communication over a communication network from a user device 122 of a user at block 302. The chat-based communication may be audio segments received via a microphone associated with a user, written communications input to a user device 122, any combination thereof, or the like. The request may also include other parameters, such as user profile data (associated with the user, such as, but not limited to, user characteristics, user demographics, user gameplay history, etc.), prior custom characters and/or content associated with the user, combinations thereof, or the like.

A custom content manager 112 (e.g., custom content manager 112 described in FIG. 1) may instantiate a new customization session for the user device 122. The customization session may include a specific environment hosted on the user device 122 presented via a communication interface. The appearance and features of the customization session and/or the specific environment may be dependent on one or more user characteristics from the user profile. For example, if the user is of a younger age, the customization session may include simplified imagery and commands.

According to some examples, the method 300 may further include interpreting the chat-based communication using a machine learning model, wherein interpreting the chat-based communication includes identifying a meaning of content within the chat-based communication and predicting that the content within the chat-based communication indicates one or more virtual characteristics at block 304. The custom content manager 112 may provision one or more machine learning models to interpret the chat-based communication, such as determining sentiment of the user (e.g., a predicted meaning of the individual words or the words as a whole), intent of the user (e.g., purpose of the individual words or the words as a whole), and one or more predicted virtual characteristics of custom content. The one or more machine learning models may be trained to interpret natural language (e.g., such as a recurrent neural network).

Method 300 may further include generating a custom character for use within a virtual environment based on the identified meaning and the predicted virtual characteristics, wherein the custom character includes the predicted virtual characteristics at block 306. The custom content manager 112 may provision one or more machine learning models to generate custom content for the user using the interpretation of the chat-based communication. For example, the custom content manager 112 may employ a machine learning model (e.g., such as a classifier, a large language model and/or transformer, a generative adversarial network, etc.) trained to generate content corresponding to the words and/or sentiment of the user.

The custom content generated by the machine learning model may include the predicted virtual characteristics, along with additional characteristics generated through input from one or more data sources. For example, the machine learning model may receive input regarding historical custom content 110, characteristics of the user, one or more character parameters associated with a game title, and/or one or more additional third-party databases. The one or more data sources may provide one or more additional virtual characteristics applicable to the custom content. For example, the historical custom content 110 and/or the characteristics of the user may indicate that other users of the same demographic as the user prefer the color blue, therefore the machine learning model may generate custom content that is blue. In another example, a particular game title may indicate that a playable character must have walking capabilities, therefore the machine learning model may generate a custom character with legs (e.g., as opposed to a snake, worm, etc.).

According to some examples, the method includes presenting a display of the custom character within a user interface of the user device 122 at block 308. The custom content manager 112 may present the custom content to the user within the specific environment of the customization session associated with the user device 122. The specific environment may be presented on the user interface of a television, a screen, a virtual reality interface, a laptop, a desktop, any combination thereof, or the like.

In some examples, the presentation of the custom character and/or object may be accompanied by one or more prompts from the custom content manager. The prompts may include a warning message (e.g., "your custom character is unable to play GAME TITLE," "your custom weapon is unable to be used in GAME TITLE"), a prompt to add/remove features (e.g., "GAME TITLE requires lots of running, would you like to add legs to your custom character?"), a probative question intended to educate the user (e.g., "It looks like GAME TITLE needs your character to fly. What would help your character fly?"), notifying the user that characteristics were added (e.g., "Eyes were added to your character in order to play GAME TITLE," "a shield was added to use with your custom sword"), any combination thereof, or the like. After receiving the prompts, the user device 122 may output one or more messages to the custom content manager 112 indicating approval/disapproval of the adjustments made to the custom content, additional virtual characteristics to add to the custom content, adjustments to the custom content, any combination thereof, or the like.

When the one or more messages are received by the custom content manager, one or more machine learning models may interpret the one or more messages (e.g., in the manner specified at block 304) and re-generate the custom content (e.g., in the manner specified at block 306). The custom content may be re-presented on the user device 122 with one or more adjustments.

Figure 3B:
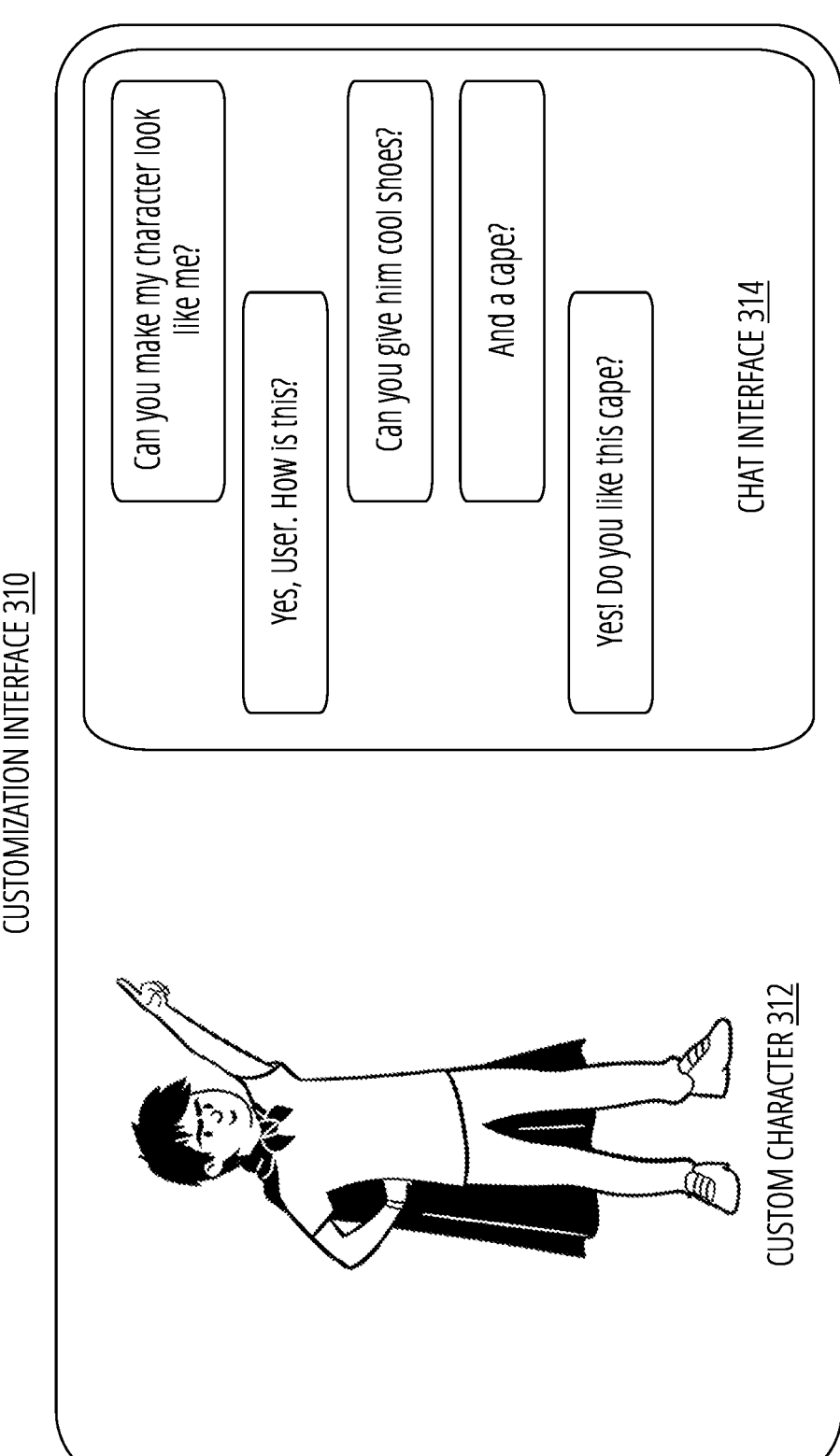
FIG. 3B illustrates an exemplary user interface that may be used in custom content generation sessions to implement the method of FIG. 3A.

FIG. 3B illustrates an exemplary user interface that may be used in custom content generation sessions to implement the method of FIG. 3A. The user interface may be displayed via a user device 122 over the duration of a customization session. A user, via one or more user devices 122 (e.g., a keyboard, microphone, mobile device, controller, etc.) may input a chat-based communication, wherein when received by a communication network, may display the chat-based communication in chat interface 314. Chat interface 314 may display one or more responses and/or one or more prompts generated by a machine-learning model configured to interpret natural language from the user. As shown in FIG. 3B, the user is in a customization session for customizing custom character 312 within customization interface 310. Upon receipt of the chat-based communication from the user, a custom content generator 114 may update custom character 312 according to the chat-based communication. For example, as shown in FIG. 3B, the user may request custom character 312 resemble the user. Thus, the custom content generator 114 may give custom character 312 short hair, brown hair, brown eyes, and fair skin.

FIG. 4A is a flowchart illustrating an exemplary method for adapting custom user-generated content for gameplay in accordance with one embodiment. Although the example flowchart depicts a particular sequence of operations, the sequence may be altered without departing from the scope of the present disclosure. For example, some of the operations depicted may be performed in parallel or in a different sequence that does not materially affect the function of the flowchart. In other examples, different components of an example device or system that implements the flowchart may perform functions at substantially the same time or in a specific sequence.

Method 400 may further include presenting a display of a custom character within a user interface of a user device 122 at block 402. A custom content manager 112 may present custom content (e.g., custom character and/or object) to a user within a specific environment of a customization session associated with the user device 122. The specific environment may be presented on the user interface of a television, a screen, a virtual reality interface, a laptop, a desktop, any combination thereof, or the like.

As illustrated, method 400 may further include receiving an option selection from the user device 122, the option corresponding to use of the custom character to participate in a gameplay session of a game title at block 404. The user may specify a particular game title to utilize the custom character. The option selection may be received via a chat-based communication, which may be an audio segment input to a user device 122 capable of receiving audio segments and/or a text-based communication input to a user device 122 capable of received text/words. The custom content manager 112 may input the chat-based communication into one or more machine learning models trained to interpret natural language (e.g., the machine learning models discussed in FIG. 1). The one or more machine learning models may determine the game title associated with the chat-based communication by searching a gaming history database associated with the user device 122 that contains a gaming history. The gaming history may include games downloaded on the user device 122, games played most frequently on the user device 122, games historically played on the user device 122, games browsed on an online marketplace associated with the user device 122, any combination thereof, or the like. Based on the database, the one-or more machine learning models may identify a particular game title indicated by the user device 122 via the chat-based communication.

According to some examples, the method 400 may further include querying a gameplay manager for one or more character parameters associated with the game title at block 406. The gameplay manager (e.g., gameplay manager 124 described in FIG. 1 and FIG. 2) may receive and/or store one or more character parameters associated with the particular game title. For example, upon selection by the user device 122, the gameplay manager may query a database associated with the particular game title for the one or more character parameters associated with the particular game title. In some examples, the gameplay manager may store one or more character parameters automatically according to the game titles included in the gaming history database.

The character parameters may be characteristics of a custom character and/or object that are necessary to utilize the character in the particular game title. For example, if a particular game title primarily takes place underwater, character parameters may include a method of breathing underwater (e.g., gills, scuba gear, magical capabilities, etc.) and/or a method of swimming (e.g., fins, webbed feet/flippers, a tail, etc.). As another example, a particular game title may require running and jumping, therefore character parameters may include a method of running (e.g., two legs, four legs, wheels, etc.) and/or a method of jumping (e.g., two legs, four legs, a jet pack/propulsion system, etc.). The character parameters may be included in a data package received upon download of the particular game title. In some examples, the gameplay manager may employ one or more machine learning models trained to identify commonalities in characters within a particular game title (e.g., the machine learning models discussed in FIG. 1). The machine learning models may identify character parameters and output the character parameters to the gameplay manager.

According to some examples, the method 400 may further include verifying the custom character includes the character parameters associated with the game title, wherein the gameplay session is launched based on the verification at block 408. The custom content manager 112 may verify the custom character includes the character parameters identified by the gameplay manager. In some examples, the custom content manager 112 may employ one or more machine learning models to identify the characteristics of the custom character. For example, the one or more machine learning models may determine that a custom character has arms, wings, a head, eyes, nose, and a weapon. The custom content manager 112 may cross-reference the character parameters with the determined characteristics of the custom character (e.g., arms, wings, a head, eyes, nose, and a weapon), and may determine that the custom character contains all necessary character parameters to complete a gameplay session of the particular game title. The user device 122 may be notified of the verification and the gameplay session may launch immediately.

Method 400 may yet further include initially determining that the custom character does not include the character parameters associated with the game title at block 410. In some examples, the custom content manager 112 may cross-reference the one or more character parameters with the determined characteristics of the custom character (e.g., arms, wings, a head, eyes, nose, and a weapon), and may determine that the custom character does not have all necessary character parameters to complete a gameplay session of the particular game title. For example, the custom character may have arms, wings, a head, eyes, nose, and a weapon, and the one or more character parameters may include "legs" and "mouth."

In some examples, a character parameter of the one or more character parameters may be given a value corresponding to a level of necessity. The value may be from zero to one, with zero corresponding to "not necessary to complete a gameplay session" and one corresponding to "extremely necessary to complete a gameplay session." In some examples, a threshold value may be set by parameters of a particular game title, the user device 122, an administrator, or the like, indicating a minimum value necessary to necessitate an adjustment of the custom character. For example, the threshold value may be set to 0.4, which may indicate that all character parameters with a value less than 0.4 are not necessary to complete a gameplay session. All character parameters with a value more than or equal to 0.4 may be necessary to complete a gameplay session. As an additional example, the custom character may have arms, wings, a head, eyes, nose, and a weapon, and the one or more character parameters may include "legs" with a value of 0.9 and "mouth" with a value of 0.2. Assuming the threshold value is at 0.4, the user device 122 may adjust the custom character to include legs, but not a mouth, and may continue to complete a gameplay session.

According to some examples, the method includes generating one or more character modifications using the machine learning model, wherein one or more character modifications comply with the character parameters at block 412. In some examples, the custom character manager may employ one or more machine learning models to generate additional virtual characteristics for the custom character according to the one or more character parameters. In some examples, the custom character manager may notify the user device 122 of any modifications with one or more prompts. The prompts may include a warning message (e.g., "your custom character is unable to play GAME TITLE"), a prompt to add/remove features (e.g., "GAME TITLE requires lots of running, would you like to add legs to your custom character?"), a probative question intended to educate the user (e.g., "It looks like GAME TITLE needs your character to fly. What would help your character fly?"), notifying the user that characteristics were added (e.g., "Eyes were added to your character in order to play GAME TITLE"), any combination thereof, or the like.

According to some examples, the method includes applying the character modifications to the custom character, wherein the custom character is verified based on the character modifications at block 414. After receiving the prompts, the user device 122 may output one or more messages to the custom content manager 112 indicating approval/disapproval of the adjustments made to the custom content, additional virtual characteristics to add to the custom content, adjustments to the custom content, any combination thereof, or the like. The custom content manager 112 may update the custom character accordingly.

The custom content manager 112 may verify the custom character includes the one or more character parameters identified by the gameplay manager. In some examples, the custom content manager 112 may employ one or more machine learning models to identify the characteristics of the custom character. For example, the one or more machine learning models may determine that a custom character has arms, wings, a head, eyes, nose, and a weapon. The custom content manager 112 may cross-reference the one or more character parameters with the determined characteristics of the custom character (e.g., arms, wings, a head, eyes, nose, and a weapon), and may determine that the custom character contains all necessary character parameters to complete a gameplay session of the particular game title. The user device 122 may be notified of the verification and the gameplay session may launch immediately. In some examples, the custom character may not include the one or more character parameters. The custom character manager may re-employ one or more machine learning models to determine the one or more character parameters that must be added to the custom character to utilize the custom character in a gameplay session. The custom character manager may repeat the method and system disclosed herein.

Figure 4B:
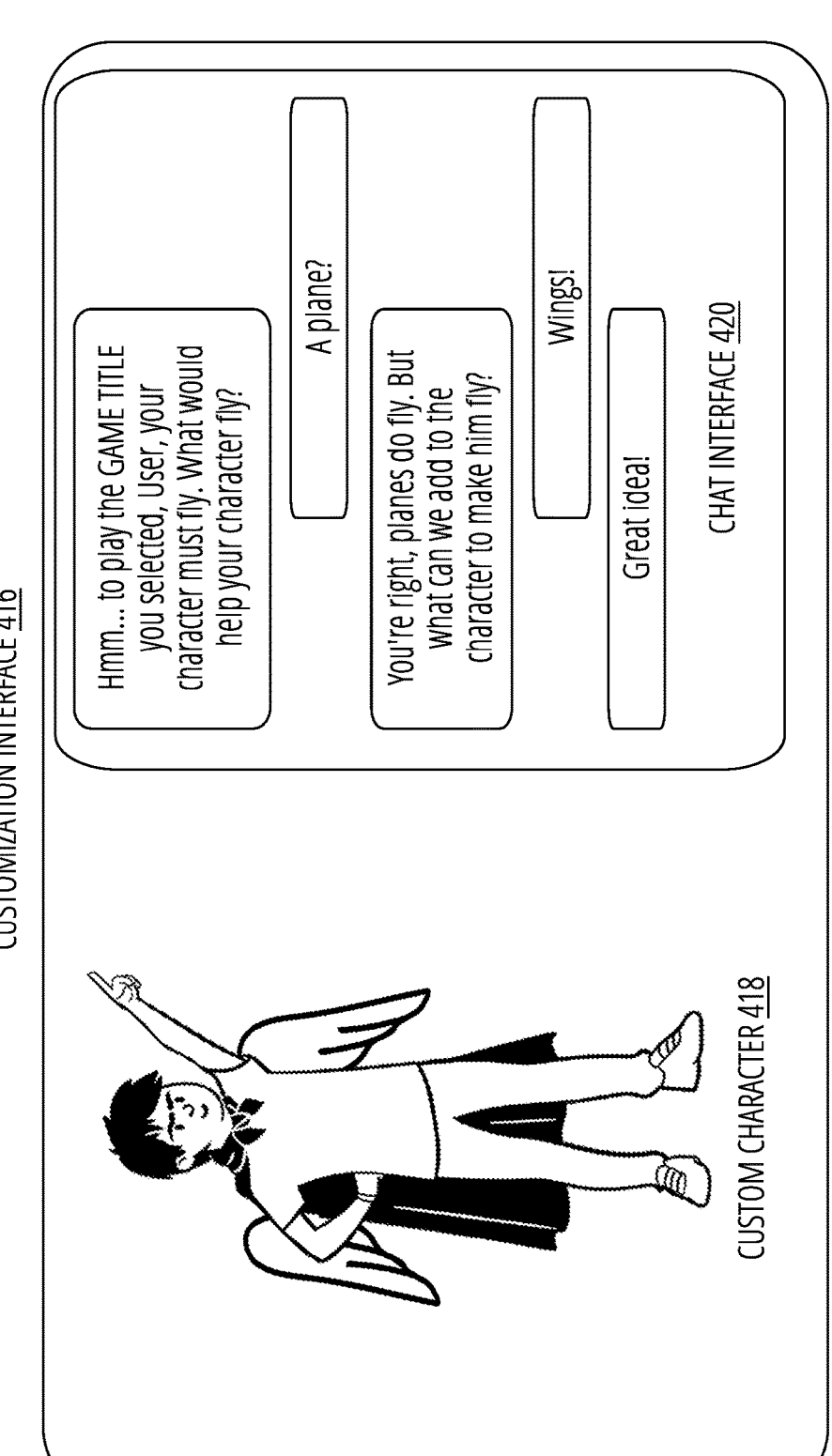
FIG. 4B illustrates an exemplary user interface that may be used in custom content generation sessions to implement the method of FIG. 4A.

FIG. 4B illustrates an exemplary user interface that may be used in custom content generation sessions to implement the method of FIG. 4A. The exemplary interface may be displayed via a user device 122 over the duration of a customization session. A user, via one or more user devices 122 (e.g., a keyboard, microphone, mobile device, controller, etc.) may input a chat-based communication, wherein when received by a communication network, may display the chat-based communication in chat interface 420. Chat interface 420 may display one or more responses and/or one or more prompts generated by a machine-learning model configured to interpret natural language from the user. As shown in FIG. 4B, the user is in a customization session for customizing custom character 418 within customization interface 416. Upon receipt of the chat-based communication from the user, a custom content generator 114 may update custom character 418 according to the chat-based communication. For example, as shown in FIG. 4B, the custom content generator 114 may notify the user that custom character 418 may require one or more character parameters to utilize custom character 418 during a gameplay session of a particular game title. The custom content generator 114 may prompt the user, via the chat-based communication within chat interface 420, that custom character 418 may require one or more modifications for the particular game title.

Figure 5:
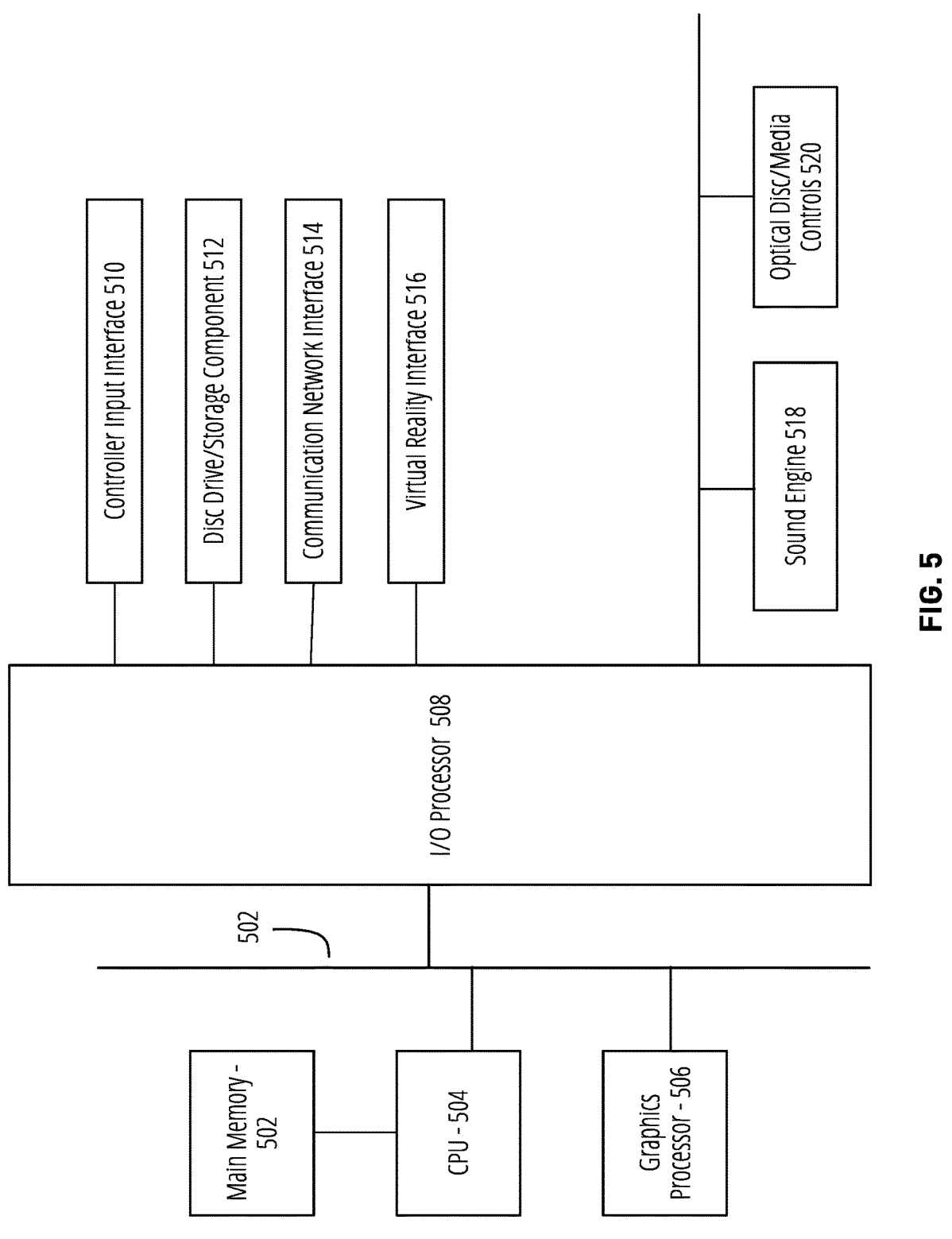
FIG. 5 illustrates a block diagram of an example electronic entertainment system in accordance with one embodiment.

FIG. 5 illustrates a block diagram of an exemplary electronic entertainment system 500 in accordance with an embodiment of the presently disclosed invention. The electronic entertainment system 500 as illustrated in FIG. 5 includes a main memory 502, a central processing unit (CPU) 504, graphic processor 506, an input/output (I/O) processor 508, a controller input interface 510, a hard disc drive or other storage component 512 (which may be removable), a communication network interface 514, a virtual reality interface 516, sound engine 518, and optical disc/media controls 520. Each of the foregoing are connected via one or more system buses 522.

Electronic entertainment system 500 as shown in FIG. 5 may be an electronic game console. The electronic entertainment system 500 may alternatively be implemented as a general-purpose computer, a set-top box, a hand-held game device, a tablet computing device, or a mobile computing device or phone. Electronic entertainment systems may contain some or all of the disclosed components depending on a particular form factor, purpose, or design.

Main memory 502 stores instructions and data for execution by CPU 504. Main memory 502 can store executable code when the electronic entertainment system 500 is in operation. Main memory 502 of FIG. 5 may communicate with CPU 504 via a dedicated bus. Main memory 502 may provide pre-stored programs in addition to programs transferred through the I/O processor 508 from hard disc drive/ storage component 512, a DVD or other optical disc (not shown) using the optical disc/media controls 520, or as might be downloaded via communication network interface 514.

The graphics processor 506 of FIG. 5 (or graphics card) executes graphics instructions received from the CPU 504 to produce images for display on a display device (not shown). The graphics processor 506 of FIG. 5 may transform objects from three-dimensional coordinates to two-dimensional coordinates, and vice versa. Graphics processor 506 may use ray tracing to aid in the rendering of light and shadows in a game scene by simulating and tracking individual rays of light produced by a source. Graphics processor 506 may utilize fast boot and load times, 4K-8K resolution, and up to 120 FPS with 120 hz refresh rates. Graphics processor 506 may render or otherwise process images differently for a specific display device.

I/O processor 508 of FIG. 5 may also allow for the exchange of content over a wireless or other communications network (e.g., IEEE 802.x inclusive of Wi-Fi and Ethernet, 5G, 4G, LTE, and 3G mobile networks, and Bluetooth and short-range personal area networks). The I/O processor 508 of FIG. 5 primarily controls data exchanges between the various devices of the electronic entertainment system 500 including the CPU 504, the graphics processor 506, controller interface 510, hard disc drive/storage component 512, communication network interface 514, virtual reality interface 516, sound engine 518, and optical disc/ media controls 520.

A user of the electronic entertainment system 500 of FIG. 5 provides instructions via a controller device communicatively coupled to the controller interface 510 to the CPU 504. A variety of different controllers may be used to receive the instructions, including handheld and sensor-based controllers (e.g., for capturing and interpreting eye-tracking-based, voice-based, and gestural commands). Controllers may receive instructions or input from the user, which may then be provided to controller interface 510 and then to CPU 504 for interpretation and execution. The instructions may further be used by the CPU 504 to control other components of electronic entertainment system 500. For example, the user may instruct the CPU 504 to store certain game information on the hard disc drive/storage component 512 or other non-transitory computer-readable storage media. A user may also instruct a character in a game to perform some specified action, which is rendered in conjunction with graphics processor 506, inclusive of audio interpreted by sound engine 518.

Hard disc drive/storage component 512 may include removable or non-removable non-volatile storage medium. Saud medium may be portable and inclusive of digital video disc, Blu-Ray, or USB coupled storage, to input and output data and code to and from the main memory 502. Software for implementing embodiments of the present invention may be stored on such a medium and input to the main memory via the hard disc drive/storage component 512. Software stored on hard disc drive 512 may also be managed by optical disk/media control 520 and/or communications network interface 514.

Communication network interface 514 may allow for communication via various communication networks, including local, proprietary networks and/or larger wide-area networks such as the Internet. The Internet is a broad network of interconnected computers and servers allowing for the transmission and exchange of Internet Protocol (IP) data between users connected through a network service provider. Examples of network service providers include public switched telephone networks, cable or fiber services, digital subscriber lines (DSL) or broadband, and satellite services. Communications network interface allows for communications and content to be exchanged between the various remote devices, including other electronic entertainment systems associated with other users and cloud-based databases, services and servers, and content hosting systems that might provide or facilitate game play and related content.

Virtual reality interface 516 allows for processing and rendering of virtual reality, augmented reality, and mixed reality data. This includes display devices such that might be partial or entirely immersive virtual environments. Virtual reality interface 516 may allow for exchange and presentation of immersive fields of view and foveated rendering in coordination with sounds processed by sound engine 518 and haptic feedback.

Sound engine 518 executes instructions to produce sound signals that are outputted to an audio device such as television speakers, controller speakers, stand-alone speakers, headphones or other head-mounted speakers. Different sets of sounds may be produced for each of the different sound output devices. This may include spatial or three-dimensional audio effects.

Optical disc/media controls 520 may be implemented with a magnetic disk drive or an optical disk drive for storing, managing, and controlling data and instructions for use by CPU 504. Optical disc/media controls 520 may be inclusive of system software (an operating system) for implementing embodiments of the present invention. That system may facilitate loading software into main memory 502.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:

receiving, by a system, a chat-based communication over a communication network from a user device describing a custom character to be generated;

identifying, by the system and using a model, a vector representation of a meaning of content within the chat-based communication generating a prediction, based at least in part on the vector representation, that the content within the chat-based communication indicates a set of virtual characteristics to be represented by the custom character to be generated;

generating the custom character for use within a virtual environment based at least in part on the vector representation of the meaning and the set of virtual characteristics, wherein the custom character includes the set of virtual characteristics; and presenting a display of the custom character within a user interface of the user device.

2. The computer-implemented method of claim 1, wherein the user interface includes one or more options for using the custom character, and further comprising:

receiving an option selection from the user device, the option corresponding to use of the custom character to participate in a gameplay session of a game title;

querying a gameplay manager for one or more character parameters associated with the game title; and verifying the set of virtual characteristics that the custom character includes are compatible with the character parameters associated with the game title, wherein the gameplay session is launched based at least in part on the verification.

3. The computer-implemented method of claim 2, further comprising:

determining that the set of virtual characteristics that the custom character includes are incompatible with the character parameters associated with the game title; and responsive to determining the incompatibility:

generating one or more character modifications using the model, wherein one or more character modifications cause a change to the set of virtual characteristics that the custom character includes.

4. The computer-implemented method of claim 1, further comprising generating one or more custom interactive storylines that include the custom character using the model, wherein the custom interactive storylines are presented within the virtual environment.

5. The computer-implemented method of claim 4, wherein the one or more custom interactive storylines are generated based at least in part on feedback from the user device.

6. The computer-implemented method of claim 1, further comprising verifying the set of virtual characteristics comply with a set of moderation parameters associated with demographic data of a user associated with the user device.

7. The computer-implemented method of claim 1, wherein the custom character is one of a set of custom characters generated to include the set of virtual characteristics and presented within the user interface, and wherein the user interface further presents a prompt to select one custom character of the set of custom characters.

8. The computer-implemented method of claim 1, further comprising generating a design prompt to present to the user device, wherein the chat-based communication is received in response to the design prompt.

9. The computer-implemented method of claim 1, wherein the model is trained using historical game data regarding stored characters including custom characters.

10. The computer-implemented method of claim 9, wherein the model is further trained using associated data from at least one of: one or more additional users, user characteristics, game titles, or game characteristics.

11. The computer-implemented method of claim 1, wherein the set of virtual characteristics is associated with one or more stored custom characters.

12. The computer-implemented method of claim 1, further comprising:

identifying one or more user characteristics associated with a user associated with the user device; and generating, with the model, additional virtual characteristics based at least in part on the identified one or more user characteristics; and generating the custom character based at least in part on the additional virtual characteristics.

13. The computer-implemented method of claim 1, further comprising generating one or more prompts that present one or more additional virtual characteristic options selectable to apply to the custom character.

14. A computing apparatus comprising:

a communication interface that communicates over a communication network with a user device, wherein the communication interface receives a chat-based communication from the user device describing a custom character to be generated; and a processor that executes instructions stored in memory, wherein the processor executes the instructions to:

identify, using a model, a vector representation of a meaning of content within the chat-based communication generate a prediction, based at least in part on the vector representation, that the content within the chat-based communication indicates a set of virtual characteristics to be represented by the custom character to be generated, and generate the custom character for use within a virtual environment based at least in part on the vector representation of the meaning and the set of virtual characteristics, wherein the custom character includes the set of virtual characteristics, wherein a display of the custom character is presented within a user interface of the user device.

15. The computing apparatus of claim 14, wherein the user interface includes one or more options for using the custom character, and wherein the processor executes further instructions to:

receive an option selection from the user device, the option corresponding to use of the custom character to participate in a gameplay session of a game title;

query a gameplay manager for one or more character parameters associated with the game title; and verify the custom character includes the character parameters associated with the game title, wherein the gameplay session is launched based at least in part on the verification.

16. The computing apparatus of claim 15, wherein the processor executes further instructions to:

initially determine that the custom character does not include the character parameters associated with the game title;

generate one or more character modifications using the model, wherein the one or more character modifications comply with the character parameters; and apply the character modifications to the custom character, wherein the custom character is verified based at least in part on the character modifications.

17. The computing apparatus of claim 14, wherein the processor executes further instructions to generate one or more prompts, wherein the prompts include one or more additional virtual characteristics applicable to the custom character that user interface input to the user device may indicate as approved or declines.

18. A non-transitory computer-readable storage medium, the computer-readable storage medium including instructions that when executed by a computer, cause the computer to:

receive, by the computer, a chat-based communication over a communication network from a user device describing a custom character to be generated;

identify, by the computer and using a model, a vector representation of a meaning of content within the chat-based communication generate a prediction, based at least in part on the vector representation, that the content within the chat-based communication indicates a set of virtual characteristics to be represented by the custom character to be generated;

generate the custom character for use within a virtual environment based at least in part on the vector representation of the meaning and the set of virtual characteristics, wherein the custom character includes the set of virtual characteristics; and present a display of the custom character within a user interface of the user device.

19. The computer-implemented method of claim 1, wherein the set of virtual characteristics are presented by the user interface that displays the custom character.

* * * * *